US011046222B2

United States Patent
Mizoi

(10) Patent No.: US 11,046,222 B2
(45) Date of Patent: Jun. 29, 2021

(54) FATIGUE REDUCING SEAT

(71) Applicant: TS TECH CO., LTD., Asaka (JP)

(72) Inventor: Kensuke Mizoi, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 16/322,828

(22) PCT Filed: Jul. 31, 2017

(86) PCT No.: PCT/JP2017/027653
§ 371 (c)(1),
(2) Date: Feb. 1, 2019

(87) PCT Pub. No.: WO2018/025796
PCT Pub. Date: Feb. 8, 2018

(65) Prior Publication Data
US 2019/0184872 A1 Jun. 20, 2019

(30) Foreign Application Priority Data
Aug. 4, 2016 (JP) .............................. JP2016-154010

(51) Int. Cl.
*B60N 2/70* (2006.01)
*B60N 2/72* (2006.01)

(52) U.S. Cl.
CPC .............. *B60N 2/7058* (2013.01); *B60N 2/70* (2013.01); *B60N 2/72* (2013.01)

(58) Field of Classification Search
CPC .......... B60N 2/7058; B60N 2/70; B60N 2/72; A47C 7/30; A47C 7/28
(Continued)

(56) References Cited

U.S. PATENT DOCUMENTS 2,265,251 A 12/1941 Reed
2,568,829 A * 9/1951 Scott .................... B60N 2/7058
267/107
(Continued)

FOREIGN PATENT DOCUMENTS

EP 0128407 A1 * 12/1984 ............... A47C 7/40
GB 900137 7/1962
(Continued)

OTHER PUBLICATIONS

International Search Report issued for International Patent Application No. PCT/JP2017/027653, dated Sep. 19, 2017, 5 pages including English translation.
(Continued)

*Primary Examiner* — Milton Nelson, Jr.
(74) *Attorney, Agent, or Firm* — Hamre, Schumann, Mueller & Larson, P.C.

(57) ABSTRACT

Provided is a seat which offers increased ride comfort and less fatigue felt even on long-time sitting. The seat includes a cushion frame, a first support member supported by the cushion frame and configured to support a seated occupant, second support members disposed at left and right sides of the first support member and configured to be deformable, and a restraining portion by which each second support member is restrained in such a manner that its laterally outer side is less likely to sink down than its laterally center side. The seat is configured such that an upper-side support surface for supporting a seated occupant is so restrained by the restraining portion as to assume a first position when no occupant is seated, and to assume a second position when an occupant is seated, the support surface facing further inward in the second position than in the first position.

15 Claims, 11 Drawing Sheets

(58) Field of Classification Search
USPC .............. 297/452.52, 452.22, 452.6, 452.46
See application file for complete search history.

(56) References Cited

U.S. PATENT DOCUMENTS

| | | | |
|---|---|---|---|
| 2,614,615 A | | 10/1952 | Vito Asaro |
| 2,641,432 A | | 6/1953 | Bielak et al. |
| 2,745,472 A | | 5/1956 | Flint |
| 2,818,105 A | | 12/1957 | Herider et al. |
| 2,998,971 A | * | 9/1961 | Strout ............... A47C 7/30 267/107 |
| 3,560,049 A | * | 2/1971 | Burton ............... A47C 7/30 297/452.49 |
| 3,727,980 A | * | 4/1973 | Tischler ............. A47C 7/20 297/452.53 |
| 4,834,451 A | * | 5/1989 | Meunier ............. A47C 7/185 297/218.2 |
| 4,883,320 A | * | 11/1989 | Izumida ............. A47C 7/282 297/452.56 |
| 5,236,247 A | | 8/1993 | Hewko |
| 6,676,218 B2 | * | 1/2004 | Fujita ............... B60N 2/5891 297/452.49 |
| 7,063,390 B2 | * | 6/2006 | Suzuki .............. B60R 22/26 297/474 |
| 7,926,872 B2 | * | 4/2011 | Chida ............... B60N 2/4228 297/216.13 |
| 9,550,440 B2 | * | 1/2017 | Nagayasu ........... B60N 2/7094 |

FOREIGN PATENT DOCUMENTS

| | | |
|---|---|---|
| JP | S5414710 U | 1/1979 |
| JP | S54154804 U | 10/1979 |
| JP | S6414053 U | 1/1989 |
| JP | H01171507 A | 7/1989 |
| JP | H01133441 U | 9/1989 |
| JP | H0254445 U | 4/1990 |
| JP | H037751 U | 1/1991 |
| JP | 2010023703 | 2/2010 |
| JP | 2016117406 A | 6/2016 |

OTHER PUBLICATIONS

Extended European Search Report issued for European Patent Application No. 17836901.3, dated Jul. 8, 2019, 7 pages.
Office Action issued for Japanese Patent Application No. 2018-531879, dated Apr. 14, 2020, 7 pages including English translation.
Office Action issued for Japanese Patent Application No. 2018-531879, dated Aug. 25, 2020, 8 pages including English translation.
Office Action issued for Chinese Patent Application No. 201780047317.2, dated Sep. 28, 2020, 11 pages including English translation.

* cited by examiner

FIG.3
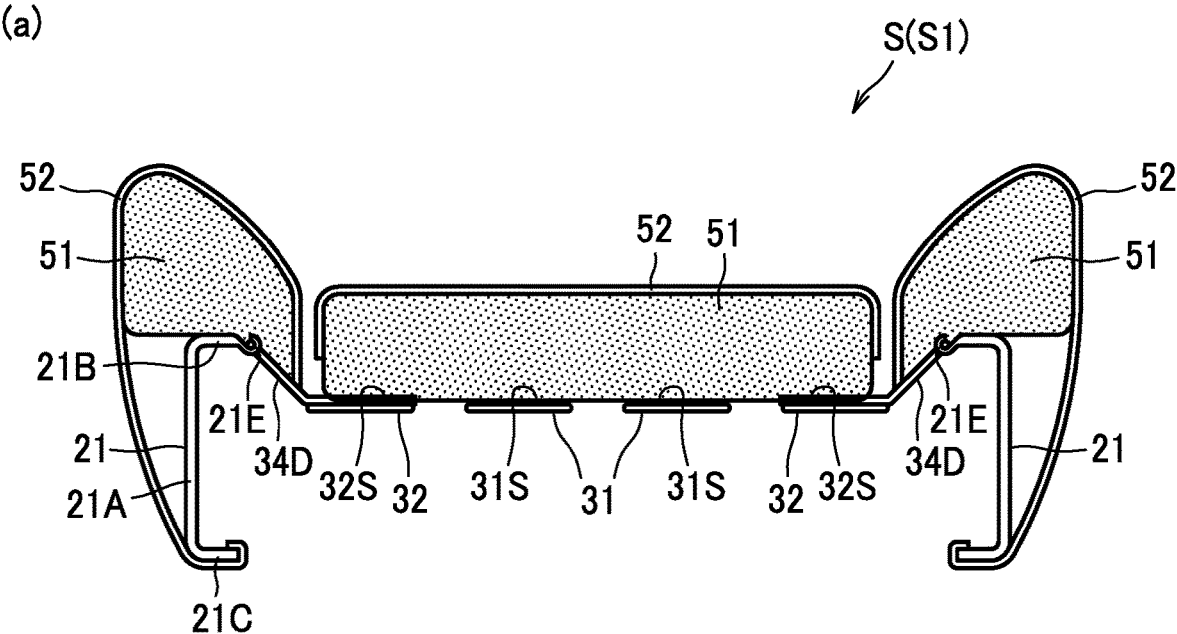
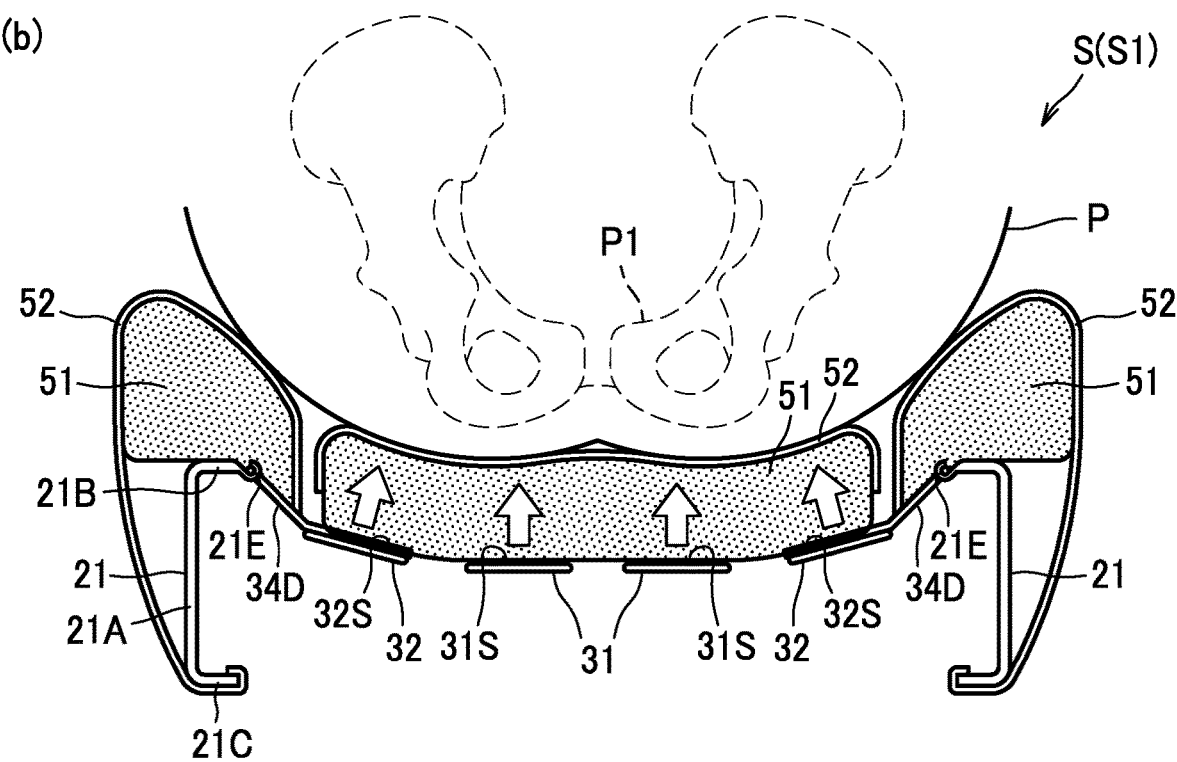

FIG.5
(a)
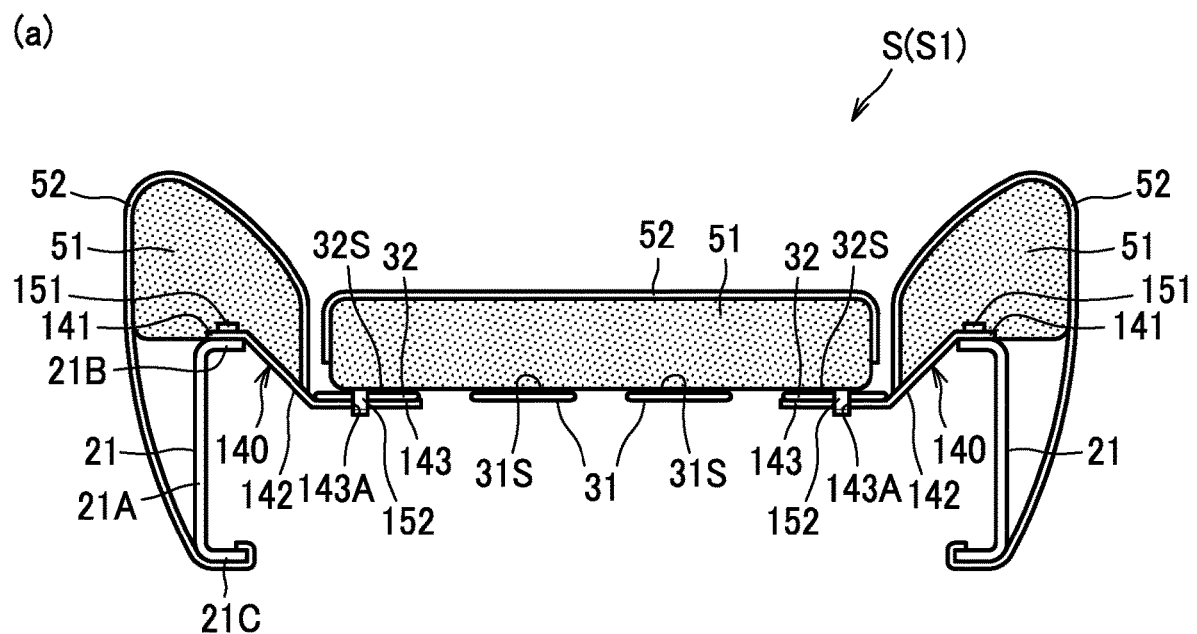
(b)
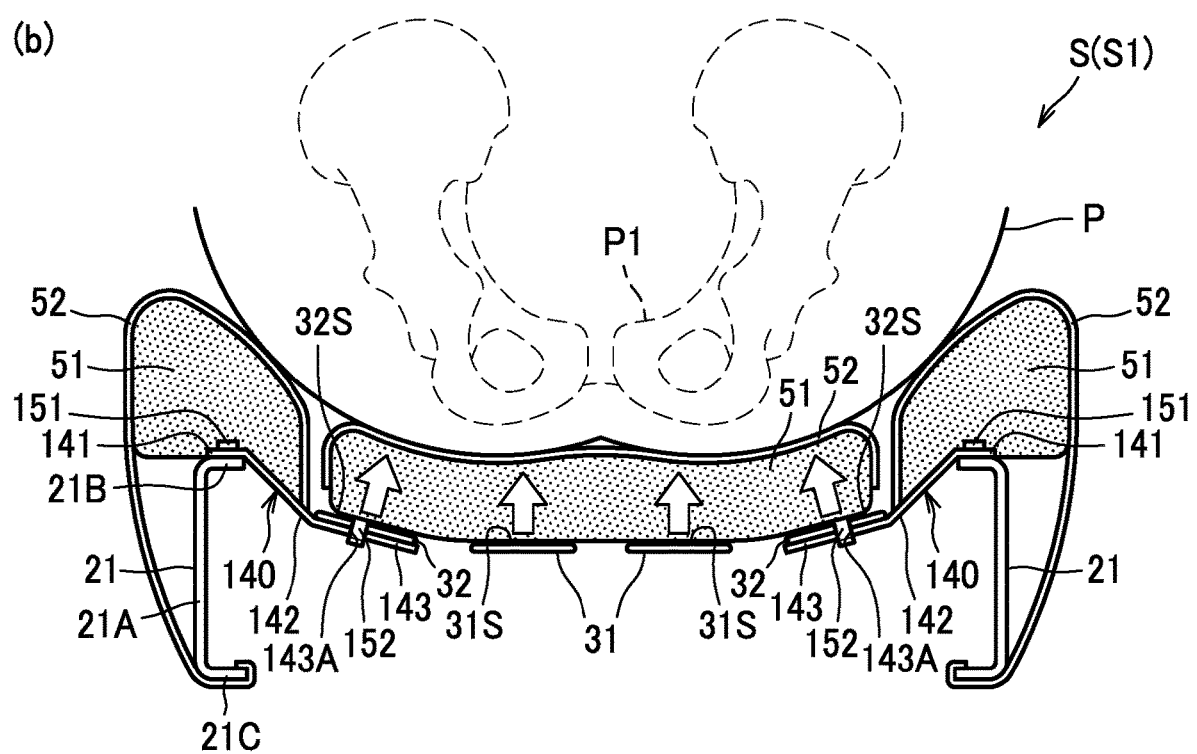

FIG.11
(a)
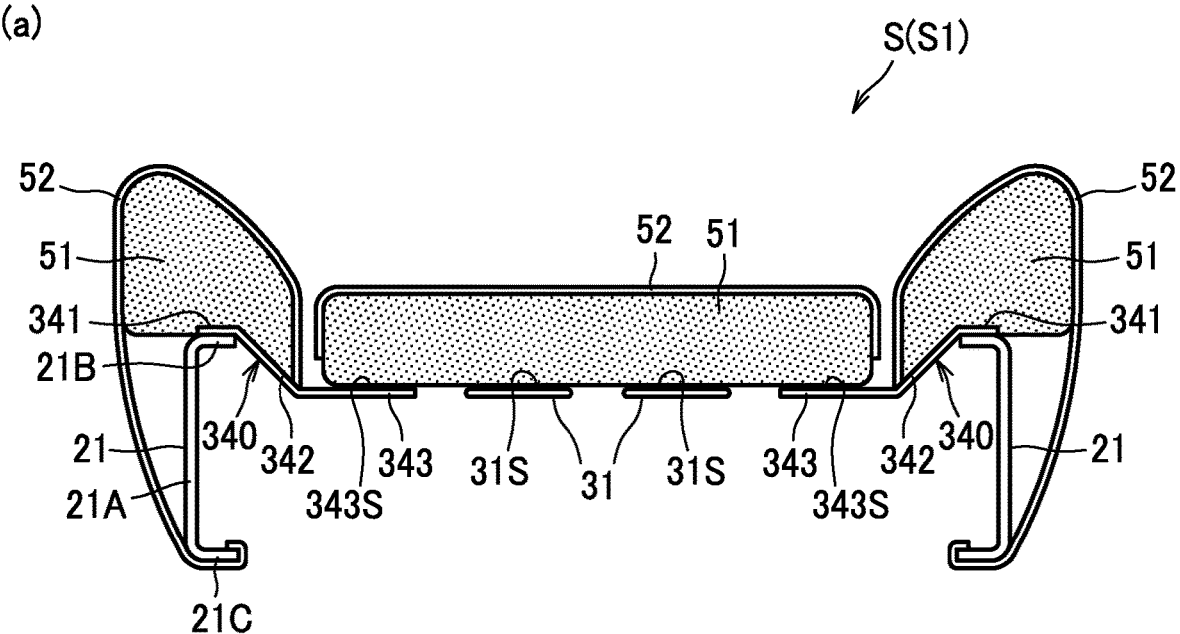
(b)
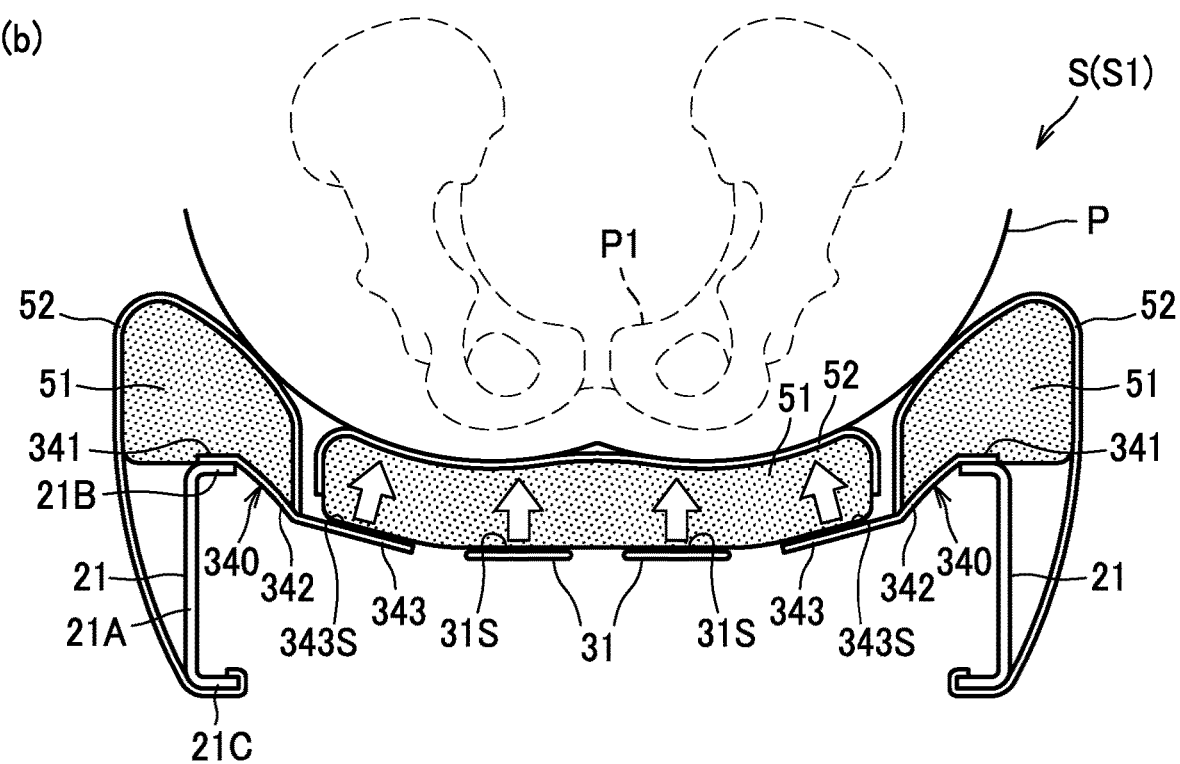

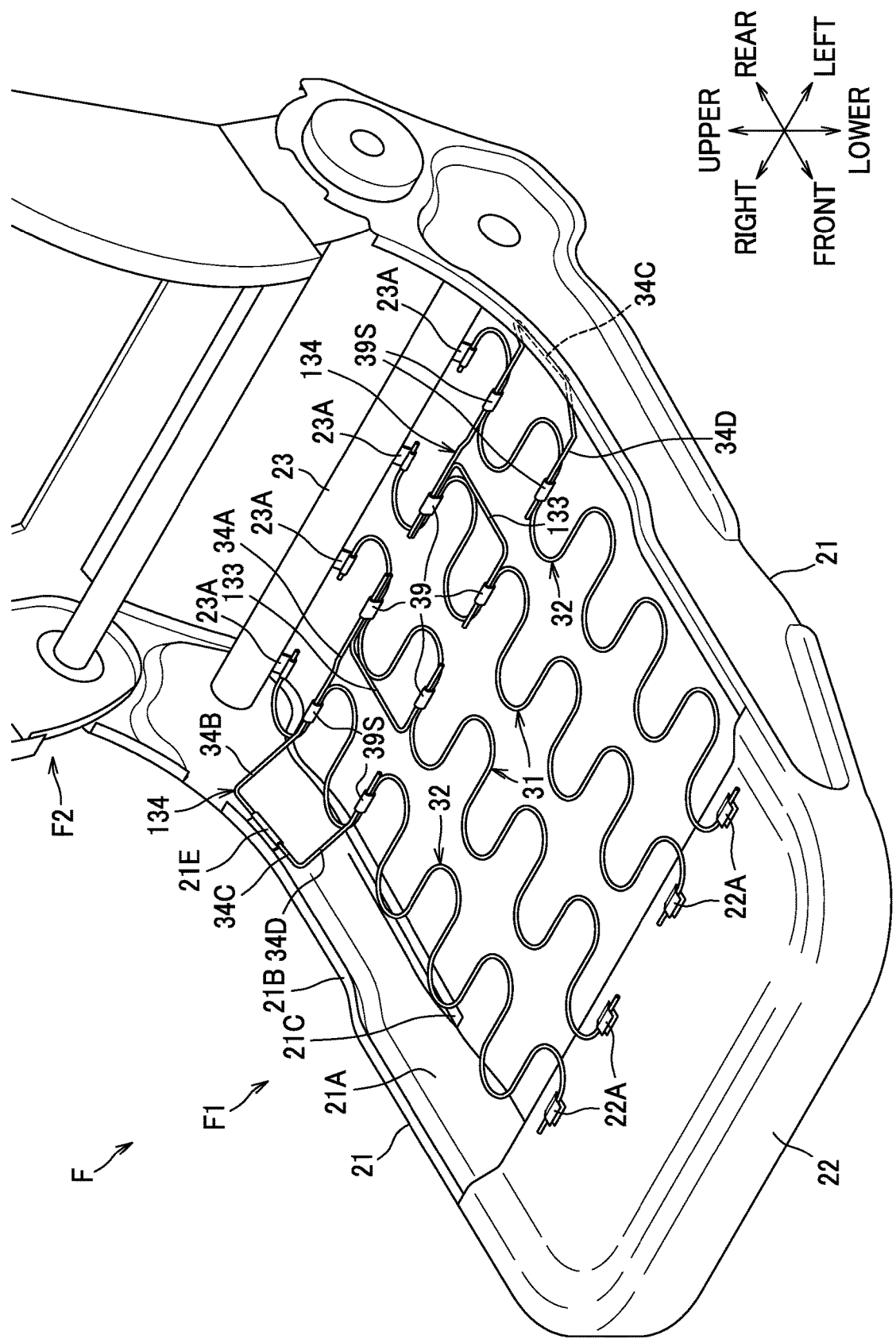

007# FATIGUE REDUCING SEAT

TECHNICAL FIELD

The present invention relates to a seat which offers less fatigue felt even on long periods of sitting.

BACKGROUND ART

Seats which offer fatigue-free sitting even for long periods of time are desired; this feature is important, particularly, for a seat employed in an automobile or the like. The automotive seat of the type that generally prevails is configured to have a plurality of springs suspended on the front and the rear or on the left and the right. Examples of this configuration may be such that equivalent springs are arranged one adjacent laterally to another at regular intervals (Patent Document 1, Patent Document 2).

Another configuration has been proposed such that tension springs arranged one adjacent to another in the front-rear direction of the seat at regular intervals and hooked on left and right side frame portions are embedded in a plastic plate formed on a curved surface along the seating line (Patent Document 3).

Yet another configuration of the seat has also be proposed such that a sheet spring is attached to a seat frame by means of hooks and a plastic support panel for supporting a pressure-exerting body portion (ischial tuberosity region) of the seated human body is provided substantially in the center of the sheet spring (Patent Document 4).

There also exists a product in which a large shallow depression contoured to fit the curved human body is provided in a pan frame constituting a seat cushion so that a load received from the peripheries of the buttocks is supported by this pan frame (Patent Document 5).

CITATION LIST

Patent Literature

Patent Document 1: JP 2016-117406 A
Patent Document 2: JP H3-7751 U
Patent Document 3: JP H2-54445 U
Patent Document 4: JP S64-14053 U
Patent Document 5: U.S. Pat. No. 5,236,247 A

SUMMARY OF INVENTION

Technical Problem

However, only arranging springs evenly in the cushion frame as disclosed in Patent Document 1 and Patent Document 2 would disadvantageously produce some fatigue felt on long periods of sitting none the less, because downwardly protruding ischial bones are supported intensively with so large a load placed thereon as to reduce the flow of blood near the ischial bones of a seated occupant. The same problem would arise in Patent Document 3 and Patent Document 4 as well, in which a plastic support member for supporting the ischial bones and their vicinities from below is provided.

On the other hand, a pan frame resisting deformation if used to support a load of a seated occupant as disclosed in Patent Document 5 would disadvantageously provide a hard feel making the seated occupant uncomfortably conscious of riding on a stiff bottom.

In view of the aforementioned technical background, it would be desirable to provide a seat which offers increased ride comfort and less fatigue felt even on long periods of sitting.

Solution to Problem

There is proposed a seat comprising: a cushion frame; a first support member supported by the cushion frame, the first support member being configured to support a seated occupant; second support members disposed at left and right sides of the first support member, the second support members being configured to be deformable; and a restraining portion by which each of the second support members is restrained in such a manner that an outer side thereof in a lateral direction is less likely to sink down than a center side thereof in the lateral direction. The seat may preferably be configured such that a support surface which faces on an upper side to support a seated occupant is so restrained by the restraining portion as to assume a first position when no occupant is seated, and to assume a second position when an occupant is seated, the support surface being tilted sideways to face inward further in the second position than in the first position.

With this configuration, the restraining portion renders the outer side of each second support member in the lateral direction unlikely to sink down, and thus renders the upper surface of the second support member likely to assume the second position in which it is tilted sideways to face inward, after a person sits down. In other words, as a person sits down on the seat, the second support member is weighed down therewith to cause the upper-side support surface of the second support member to change its posture from the first position to the second position in which it is tilted sideways to face inward further than in the first position. Accordingly, side portions of the buttocks and femoral regions of the seated occupant are held from outside and supported obliquely upward between the second support members, so that the second support members firmly support the side portions of the buttocks and the femoral regions of the seated occupant, more firmly in comparison with an alternative configuration in which the second support members are not tilted. As a result, the pressure placed on and around the ischial bones are lowered relatively, so that the seated occupant is supported on the entire region including the ischial bones and their vicinities, the buttocks, and the femoral regions with balanced pressure distribution. This can prevent poor blood circulation and thus serve to reduce the likelihood of getting a feeling of fatigue.

Furthermore, since this seat is configured to have the second support members deformable into a tilted posture, the seat cushion approximates a shape which fits the shape of the buttocks and the femoral regions of the seated occupant, so that an increased riding comfort can be offered irrespective of the physique of the seated occupant.

In the above-described seat, each of the second support members may include an S spring slung across the cushion frame in a front-rear direction, the S spring winding leftward and rightward alternately.

In the above-described seat, the cushion frame may include a pair of side frames disposed separately from each other in the lateral direction, the pair of side frames extending in the front-rear direction, and the restraining portion may include a pair of third support members each including a first portion and a second portion, the second portion being disposed at a laterally inner side of the first portion, the first portion of each of the third support members being connected to a corresponding side frame, and the second portion of each of the third support members being disposed to support the second support member.

With this configuration, since the third support member has the first portion connected to the side frame and so restrained as not to lower and the second portion disposed to support the second support member, the connected portion of the second support member is rendered unlikely to lower. Accordingly, the second support member can readily assume the second position when a person sits on the seat.

In the above-described seat, it is desirable that each of the third support members is connected to a corresponding second support member at a position laterally outer side with respect to a central position of the second support member in the lateral direction.

With this configuration, the portion of the second support member at the laterally outer side is rendered unlikely to lower; therefore, the second support member can readily assume the second position when a person sits on the seat.

In the above-described seat, each of the third support members may be of a band, a plastic plate, or a metal wire.

In the above-described seat, the cushion frame may include a pair of side frames disposed separately from each other in the lateral direction, the pair of side frames extending in the front-rear direction, each of the second support members being an elastically deformable member of which a laterally outer end is unrotatably fixed to a corresponding side frame, and the restraining portion may be a portion at which the second support member is unrotatably fixed to the side frame.

In this configuration, the side frame and the second support member may consists of an integral member.

In the above-described seat, the first support member may include an S spring slung across the cushion frame in the front-rear direction, the S spring winding leftward and rightward alternately.

BRIEF DESCRIPTION OF DRAWINGS

FIG. 3 includes section views of the seat cushion as viewed in a front-rear direction; (a) shows a state before an occupant sits down; and (b) shows a state after the occupant sits down.

FIG. 5 includes section views of a seat cushion in the car seat according to the second embodiment as viewed in the front-rear direction; (a) shows a state before an occupant sits down; and (b) shows a state after the occupant sits down.

FIG. 11 includes section views of a seat cushion in the car seat according to the fourth embodiment; (a) shows a state before an occupant sits down; and (b) shows a state after an occupant sits down.

FIG. 12 is a perspective view of a cushion frame and a seat back frame incorporated in a car seat according to a fifth embodiment.

DESCRIPTION OF EMBODIMENTS

Hereafter, a description will be given of a car seat as an example of a seat with reference made to the accompanying drawings.

First Embodiment

Figure 1:
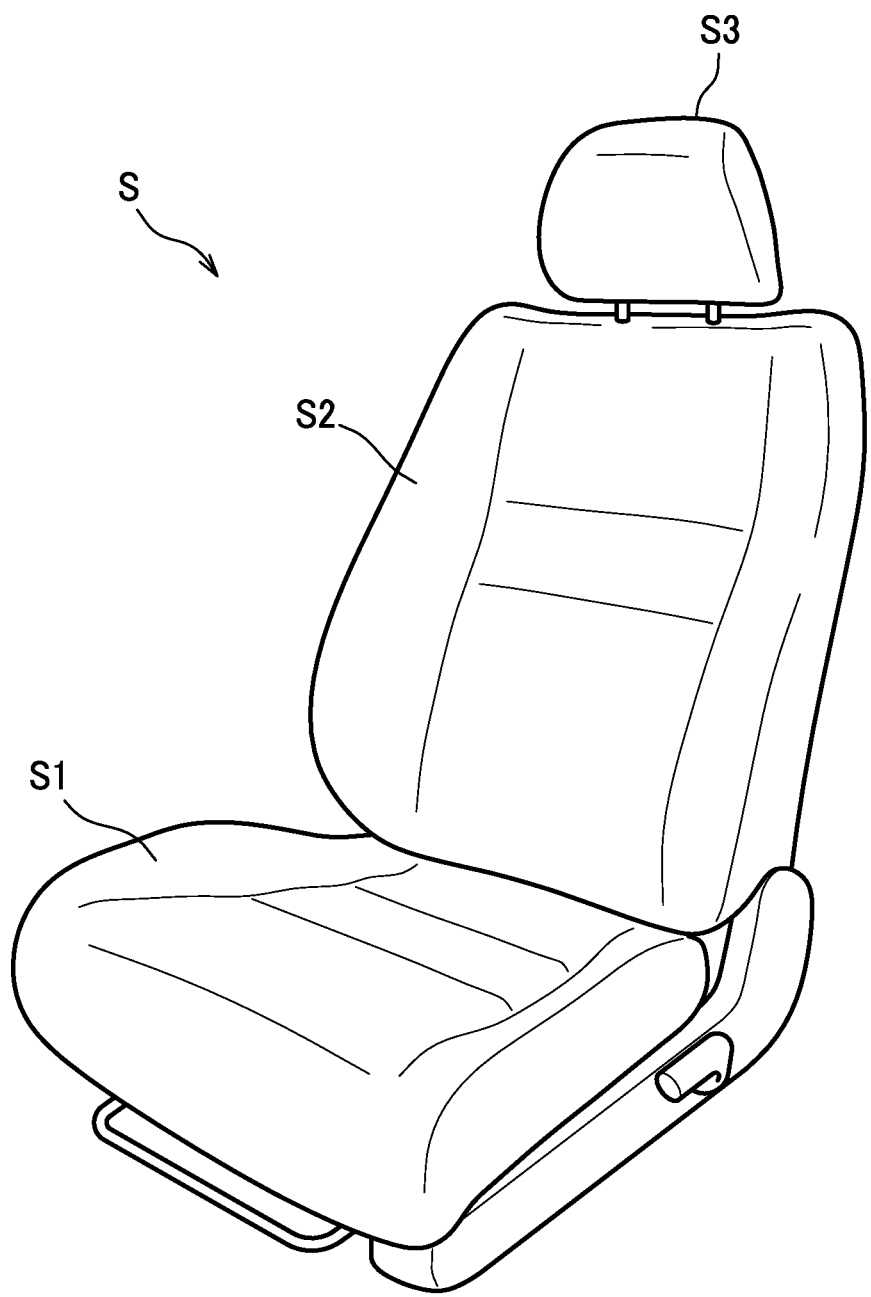
FIG. 1 is a perspective view of a car seat as an example of a seat.

The car seat in one embodiment is configured, for example as shown in FIG. 1, as a car seat S installed for a driver's seat of an automobile. This car seat S includes a seat cushion S1, a seat back S2, and a headrest S3 which are upholstered with a cushion pad 51 made of urethane foam or other cushiony material and an outer covering 52 made of synthetic leather, fabrics or the like with which the cushion pad 51 is covered (see FIG. 3). In the following description, the front/rear (frontward/rearward), and left/right (leftward/rightward; lateral) directions are designated with reference to an occupant as an example of a seated occupant or a person seated on the seat cushion S1.

Figure 2:
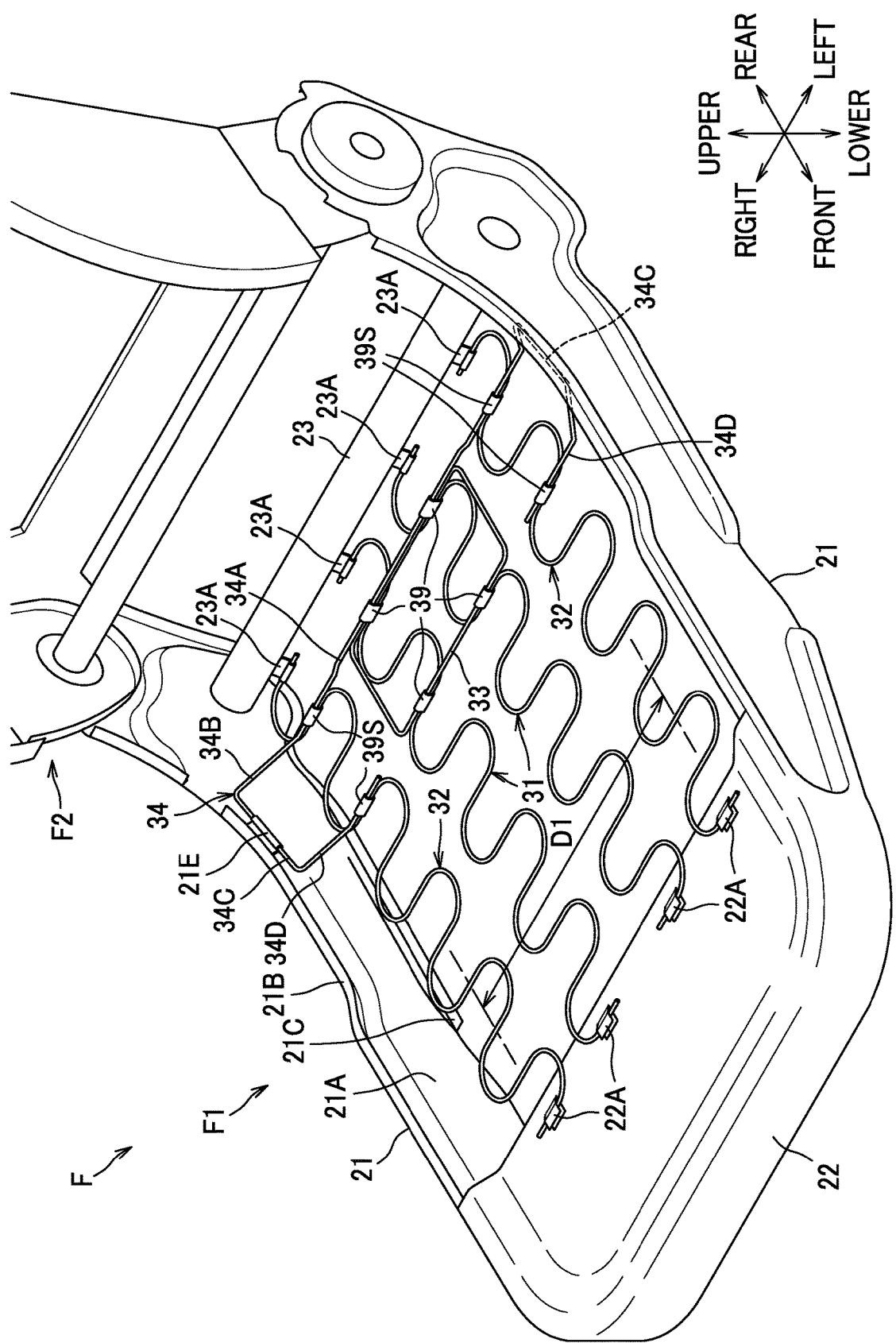
FIG. 2 is a perspective view of a cushion frame and a seat back frame incorporated in the car seat shown in FIG. 1.

As shown in FIG. 2, inside the car seat S, a seat frame F is incorporated as shown in FIG. 2. The seat frame F includes a cushion frame F1 which constitutes a framework of the seat cushion S1, and a seat back frame F2 which constitutes a framework of the seat back S2. Although not illustrated, the headrest S3 also incorporates a headrest frame which constitutes its framework.

The cushion frame F1 includes a pair of side frames 21 disposed laterally separately from each other and extending in a front-rear direction, a front frame 22 connecting front end portions of the side frames 21, and a rear frame 23 connecting rear end portions of the side frames 21.

Each side frame 21 includes a side wall portion 21A facing in a lateral direction, an upper flange 21B extending from an upper end of the side wall portion 21A laterally inward, and a lower flange 21C extending from a lower end of the side wall portion 21A laterally inward. In a position of the upper flange 21B rearward relative to its center in the front-rear direction is formed a hook 21E for a hanger wire 34 (which will be described later) to be hooked thereon.

The front frame 22 is a frame made of sheet metal, what is called a pan frame. The front frame 22 includes four hooks 22A arranged side by side separately from each other on an upper surface thereof, which are provided by cutting and raising part of sheet metal constituting the front frame 22.

The rear frame 23 is a frame made of pipe. The rear frame 23 includes four hooks 23A arranged side by side separately from each other.

Four elastically deformable S springs winding leftward and rightward alternately (to be more specific, first S springs 31 and second S springs 32) are slung across the cushion frame F1 in the front-rear direction between the front frame 22 and the rear frame 23. The two first S springs 31 are disposed in the laterally central position inside the cushion frame F1. The first S springs 31 are an example of a first support member configured to support a seated occupant, and specifically, are disposed to cross through directly under the vicinities of the ischial bones of the occupant. The second S springs 32 are an example of second support members configured to be deformable, and disposed generally in positions laterally outside relative to the lowermost protrusive portions of the ischial bones of the occupant (the laterally central position of each second S spring 32 is located laterally outside of the lowermost protrusive portions of the ischial bones of the occupant). Accordingly, for example, a distance (pitch) D1 between the laterally central positions of the two second S springs 32 may be 21 to 27 cm, or preferably 22 to 26 cm. The front ends of the first S springs 31 and the second S springs 32 are hooked on the hooks 22A, respectively, and the rear ends of the first S springs 31 and the second S springs 32 are hooked on the hooks 23A, respectively.

The cushion frame F1 includes a metal reinforcing wire 33 by which the two first S springs 31 are connected to each other, and a hanger wire 34 as an example of a restraining portion or a third support member, by which the rear end portions of the first S springs 31 and the second S springs 32 are connected to each other and the second S springs 32 are connected to the side frames.

The reinforcing wire 33 is a wire bent to assume a rectangular form as viewed from above, and fixed to the first S springs 31 by crimped members 39 made of metal plates. To be more specific, the reinforcing wire 33 is so dimensioned as to surround both of a single S-shaped portion formed at the rear end portion of the left first S spring 31 and a single S-shaped portion formed at the rear end portion of the right first S spring 31, and is fixed to the first S springs 31 by crimped members 39 at four spots on the front and rear sides of the respective S-shaped portions.

The hanger wire 34 is a metal wire having left and right U-shaped portions that open toward laterally inward opposite to each other and are partly connected to each other. The hanger wire 34 is connected, at its first portions (portions hooked on hooks 21E) disposed at a laterally outer side, to the side frames 21 by being hooked on hooks 21E, and is connected, at its second portions (portions at which crimped members 39S are provided) disposed at laterally inner sides of the first portions, to the second S springs 32.

To be more specific, the hanger wire 34 includes a left-right connecting portion 34A extending horizontally in the lateral direction, rear hanger portions 34B extending from left and right ends of the left-right connecting portion 34A obliquely in laterally-outward-and-upward directions, front-rear extension portions 34C extending from left and right ends of the rear hanger portions 34B frontward, and front hanger portions 34D extending from front ends of the front-rear extension portions 34C in laterally-inward-and-downward directions and further extending horizontally in the laterally inward directions.

The hanger wire 34 stretches little in the lateral direction; thus, an elastic modulus of the hanger wire 34 in the lateral direction is lower than an elastic modulus of the second S springs 32 in the front-rear direction.

The left-right connecting portion 34A is fixed to laterally extending portions of respective rear end portions of the first S springs 31 and the second S springs 32 by the crimped members 39, 39S.

Each of the front-rear extension portions 34C is hooked on the hook 21E of the side frame 21.

Each of the front hanger portions 34D is fixed by the crimped member 39S to a portion of the second S spring 32 that is a laterally extending portion thereof located frontward of the left-right connecting portion 34A. Each front hanger portion 34D terminates at a position in which the second S spring 32 is disposed and which is short of the first S spring 31. The positions of the front hanger portions 34D in the front-rear direction are located on, around or slightly ahead of the position of the ischial bones of an average person seated thereon.

Since the left-right connecting portion 34A connects the rear end portions of the first S springs 31 and the second S springs 32, the rear end portions of the four S springs (the first S springs 31 and the second S springs 32) are combined together to thereby possess increased rigidity.

On the other hand, in position frontward of the left-right connecting portion 34A, two first S springs 31 are connected together with the reinforcing wire 33, and thus have relatively high rigidity, while the second S springs 32 are not connected to the adjacent first S springs, and thus are made relatively yieldable. Moreover, the hanger wire 34 connects the rear portions of the second S springs 32 (herein, a specific range of the rear portions frontward of the left-right connecting portion 34A) to the side frames 21 disposed at laterally outer sides thereof, thereby restraining each of the second S springs 32 in such a manner that an outer side thereof in the lateral direction is less likely to sink down than a center side thereof in the lateral direction. With this restraint, as will be described in detail, the second S spring 32 is configured such that a support surface thereof which faces on an upper side to support a seated occupant assumes a first position when no occupant is seated, and to assume a second position (in which the support surface is tilted sideways to face inward further than in the first position) when an occupant is seated.

Operations and advantageous effects of the car seat S configured as described above will be described hereafter with reference to FIG. 3.

In a state where no occupant is seated on the seat cushion S1, as shown in FIG. 3(a), the first S springs 31 and the second S springs 32 do not sag down, and the support surfaces 32S of the second S springs 32 face vertically upward (a first position). The support surfaces 31S of the first S springs 31 also face vertically upward.

When an occupant P sits on the seat cushion S1, as shown in FIG. 3(b), the first S springs 31 and the second S springs 32 are weighed down with the occupant P. In that event, the first S springs 31 sink down with their support surfaces 31S being kept facing upward, while the second S springs 32 connected to the side frames 21 disposed at laterally outer sides of the second S springs 32 via the front hanger portions 34D of the hanger wire 34 have their laterally outer sides less likely to sink down than their laterally inner sides whereby the support surfaces 32S become tilted sideways to face laterally inward (second position) relative to the vertically-upward-facing position. Accordingly, the side portions of the buttocks and femoral regions of the seated occupant P are held from outside and supported obliquely upward between the second S springs 32, so that the second S springs 32 firmly support the side portions of the buttocks and the femoral regions of the seated occupant P, more firmly in comparison with an alternative configuration in which the second S springs 32 are not restrained by the front hanger portions 34D of the hanger wire 34. As a result, the pressure placed on and around the ischial bones P1 (precisely, on the lowermost protrusive portions of the ischial bones; the same shall apply hereinafter) is lowered relatively, so that the seated occupant is supported on the entire region including the ischial bones P1 and their vicinities, the buttocks, and the femoral regions with balanced pressure distribution. Thus, with the car seat S according to the present embodiment, poor blood circulation in the buttocks and femoral regions of the seated occupant P can be prevented and the likelihood of the seated occupant P getting a feeling of fatigue can be reduced accordingly.

Moreover, the second S springs 32 are deformable to have their support surfaces 32S tilted sideways to face laterally inward according to the weight and size of the seated occupant P, so that the seat cushion S1 become contoured to approximate the shapes which fit those of the buttocks and femoral regions of the seated occupant P, and a good riding comfort can be offered irrespective of the physique of the seated occupant P.

In describing the present embodiment, the first S springs 31 and the second S springs 32 attached to the front frame 22 and the rear frame 23 using the hooks 22A and the hooks 23A are illustrated; it is however to be understood that the method of attachment for these members is not limited to this specific example, but may include screwing, welding, or using any other parts for attachment. Also, the hanger wire 34 hooked on the hooks 21E and thereby connected to the side frames 21 is illustrated therein, but the method of connection is not limited to this specific example, but may include screwing, or using bands for tying up these members.

Second Embodiment

Next, a description will be given of a car seat according to a second embodiment. In describing the second embodiment, only the aspects distinct from those of the first embodiment will be mentioned, and a detailed description of the features in common with those of the first embodiment, which may be illustrated in the drawings with the same reference numerals, will be omitted.

Figure 4:
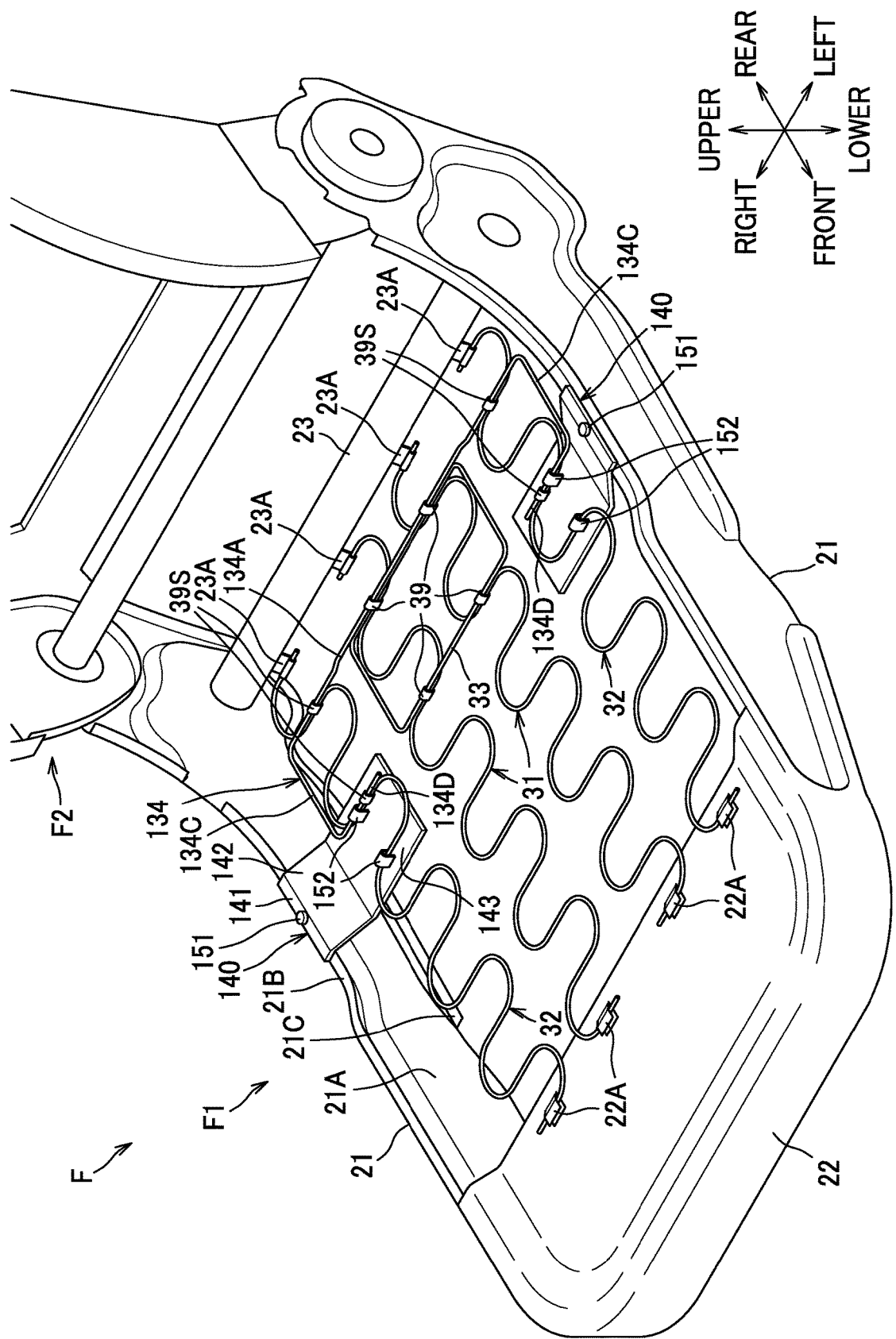
FIG. 4 is a perspective view of a cushion frame and a seat back frame incorporated in a car seat according to a second embodiment.

As shown in FIG. 4, a cushion frame F1 of a car seat implemented according to the second embodiment is configured such that a second reinforcing wire 134 corresponding to the hanger wire 34 is not connected to the side frames 21, but instead, the cushion frame F1 is provided with plastic support plates 140 as an example of the third support member, by which the side frames 21 and the second S springs 32 are connected.

The second reinforcing wire 134 includes a left-right connecting portion 134A extending horizontally in the lateral direction, front-rear extension portions 134C extending from left and right ends of the left-right connecting portion 134A frontward, and front connecting portions 134D extending from front ends of the front-rear extension portions 134C horizontally in laterally inward directions.

The left-right connecting portion 134A is fixed to laterally extending portions of respective rear end portions of the first S springs 31 and the second S springs 32 by crimped members 39, 39S Each of the front-rear extension portions 134C extends in the front-rear direction along the laterally outer side end portion of the corresponding second S spring 32.

Each of the front connecting portions 134D is fixed by the crimped member 39S to a portion of the second S spring 32 that is a laterally extending portion thereof located frontward of the left-right connecting portion 134A. Each front connecting portion 134D terminates at a position in which the second S spring 32 is disposed and which is short of the first S spring 31. Thus, the second reinforcing wire 134 is configured to connect the rear end portions of the two first S springs 31 and the two second S springs 32 to thereby enhance the rigidity of the rear end portions. In a predetermined range of the second S springs 32 frontward of the rear end portions thereof, the front-rear extension portions 134C are provided, and thus laterally outer side portions of the second S springs 32 are enhanced slightly in rigidity.

The support plates 140 comprise elastically deformable plastic plates, each including a fixed portion 141 laid on an upper flange 21B of the side frame 21, an extension portion 142 extending from a laterally inner end of the fixed portion 141 in an obliquely downward direction, and a support portion 143 extending from a laterally inner end of the extension portion 142 horizontally in a laterally inward direction.

The fixed portion 141 is fixed on the upper flange 21B of the side frame 21 by a fixing member 151 such as a clip or a screw.

The support portion 134 is fixed to the second S spring 32 by fixing members 152 such as clips or tie bands. The support portion 143 has a through hole 143A provided to allow the fixing member 152 to be inserted therethrough, as shown in FIG. 5(a). Referring back to FIG. 4, a position in which the fixing member 152 is disposed, i.e., a position in which the support plate 140 is connected to the second S spring 32 is located on a laterally outer side with respect to a laterally central position of the second S spring 32. With this arrangement, when the weight of a seated occupant is applied to the second S spring 32 from above, the support surface 32S of the second S spring 32 is likely to face laterally inward because the second S spring 32 is restrained at a position laterally outer side with respect to the laterally center position.

Operations and advantageous effects of the car seat configured as described above will now be described.

In a state where no occupant is seated on the seat cushion S1, as shown in FIG. 5(a), the first S springs 31 and the second S springs 32 do not sag down, and the support surfaces 32S of the second S springs 32 face vertically upward (the first position). The support surfaces 31S of the first S springs 31 also face vertically upward.

When an occupant P sits on the seat cushion S1, as shown in FIG. 5(b), the first S springs 31 and the second S springs 32 are weighed down with the occupant P. In that event, the first S springs 31 sink down with their support surfaces 31S being kept facing upward, while the second S springs 32 connected to the side frames 21 disposed at laterally outer sides of the second S springs 32 via the support plate 140 have their laterally outer sides less likely to sink down than their laterally inner sides whereby the support surfaces 32S become tilted sideways to face laterally inward (the second position) relative to the vertically-upward-facing position. Accordingly, as with the first embodiment, the pressure placed on and around the ischial bones P1 is lowered relatively, so that the seated occupant is supported on the entire region including the ischial bones P1 and their vicinities, the buttocks, and the femoral regions with balanced pressure distribution. Thus, with the car seat according to the present embodiment as well, poor blood circulation in the buttocks and femoral regions of the seated occupant P can be prevented and the likelihood of the seated occupant P getting a feeling of fatigue can be reduced accordingly.

Moreover, the second S springs 32 are deformable to have their support surfaces 32S tilted sideways to face laterally inward according to the weight and size of the seated occupant P, so that the seat cushion S1 may become contoured to approximate the shapes which fit those of the buttocks and femoral regions of the seated occupant P, and a good riding comfort can be offered irrespective of the physique of the seated occupant P.

The inventor made a comparison of driver's feelings of fatigue between a seat configured as a car seat prepared according to the second embodiment in which the support plate 140 is provided and a seat as a comparative example prepared by removing the support plate 140 from the car seat of the second embodiment. To be more specific, the same driver drove along the same route for three hours, and the lactate level of the driver was measured during each driving operation. The result has shown that the lactate level measured for the seat with the support plate 140 is approximately half of the lactate level measured for the comparative example without the support plate 140.

Figure 6:
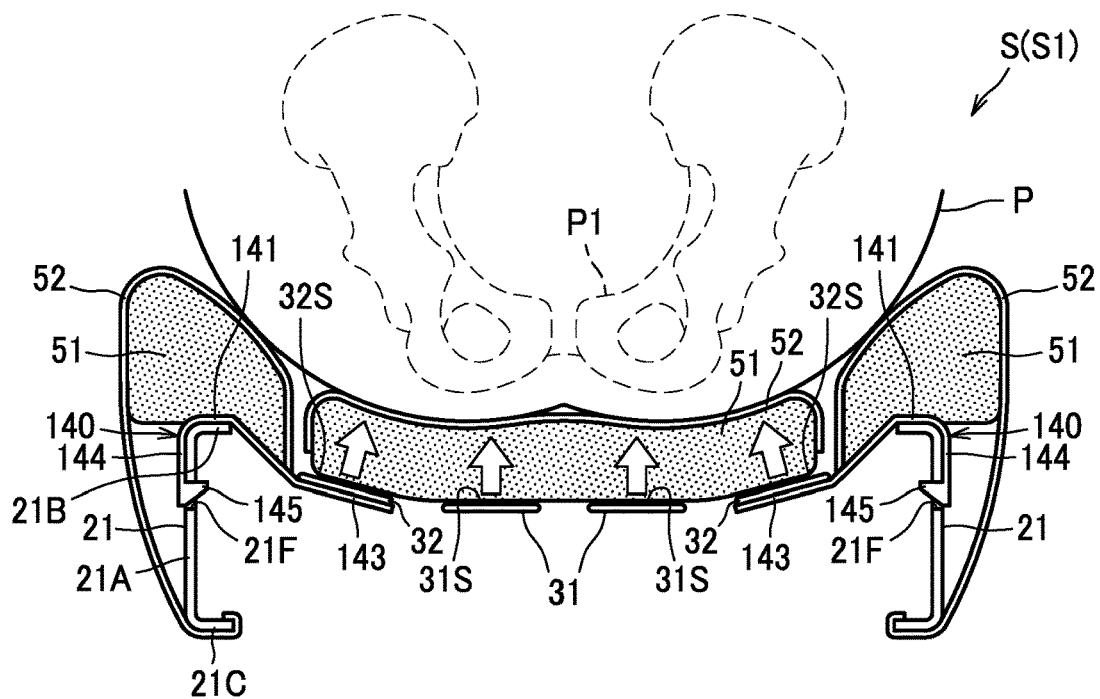
FIG. 6 is a section view of a seat cushion in a car seat according to a first modified example of the second embodiment as viewed in the front-rear direction.

It is to be understood that the support plate 140 made of a plastic plate as shown in FIGS. 4 and 5 may not necessarily be fixed to the side frame 21 by a clip or the like, but may be configured for example as shown in FIG. 6. The support plate 140 shown in FIG. 6 includes a sidewall portion 144 extending from the left or right end of the fixed portion 141 downward, and an engageable claw 145 protruding from a lower end of the sidewall portion 144 inward. On the other hand, the sidewall portion 21A of the side frame 21 has an engageable hole 21F provided in a position corresponding to the engageable claw 145. The support plate 140 is connected to the side frame 21 with the engageable claw 145 engaged in the engageable hole 21F.

If the support plate 140 detouring around the side frame 21 and extending along its laterally outer side is provided as described above, the support plate 140 is, like a fixed beam, unlikely to rotate on left or right end; therefore, the laterally inner end portion of the support plate 140 may not be fixed to the second S spring 32.

Figure 7:
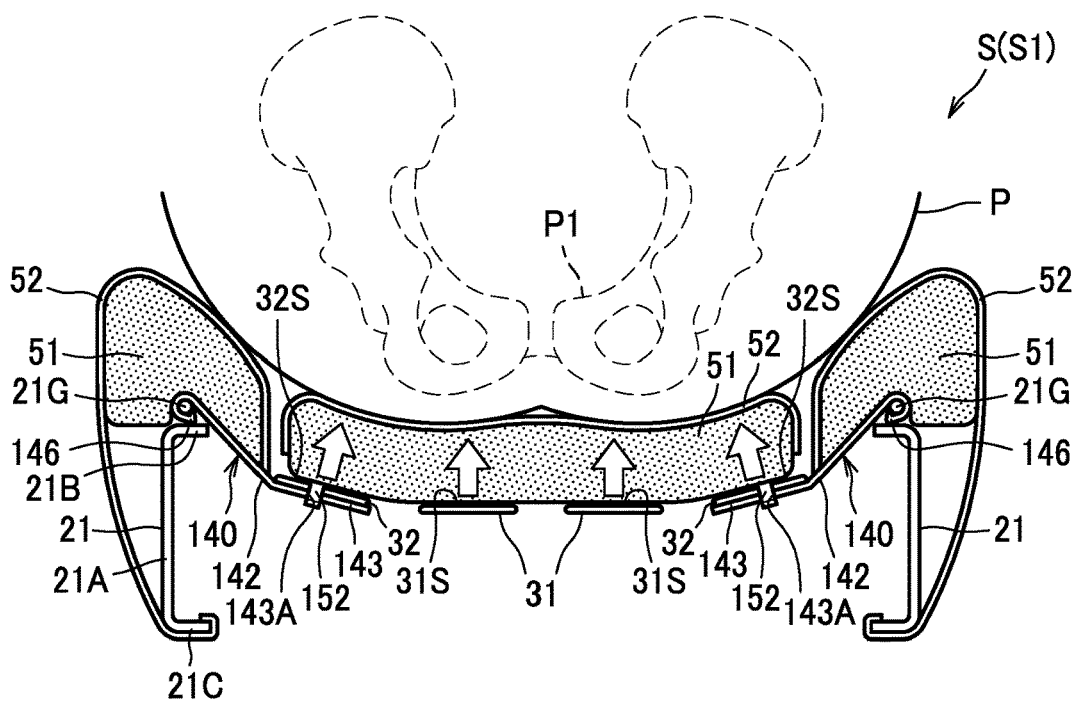
FIG. 7 is a section view of a seat cushion in a car seat according to a second modified example of the second embodiment as viewed in the front-rear direction.

An alternative example as shown in FIG. 7 may be applicable in which the support plate 140 made of a plastic plate is shaped otherwise. The support plate 140 of FIG. 7 is provided with a hook 146 in a position corresponding to the fixed portion 141. On the other hand, the upper flange 21B of the side frame 21 has a rod 21G extending in a front-rear direction, which rod is provided on the upper flange 21B. The support plate 140 is connected to the side frame 21 with the hook 146 engaged on the rod 21G.

With this configuration, the support plate 140 can be connected to the side frame 21 in a simple operation.

Third Embodiment

Next, a description will be given of a car seat according to a third embodiment. In describing the third embodiment, only the aspects distinct from those of the second embodiment will be mentioned, and a detailed description of the features in common with those of the second embodiment, which may be illustrated in the drawings with the same reference numerals, will be omitted.

Figure 8:
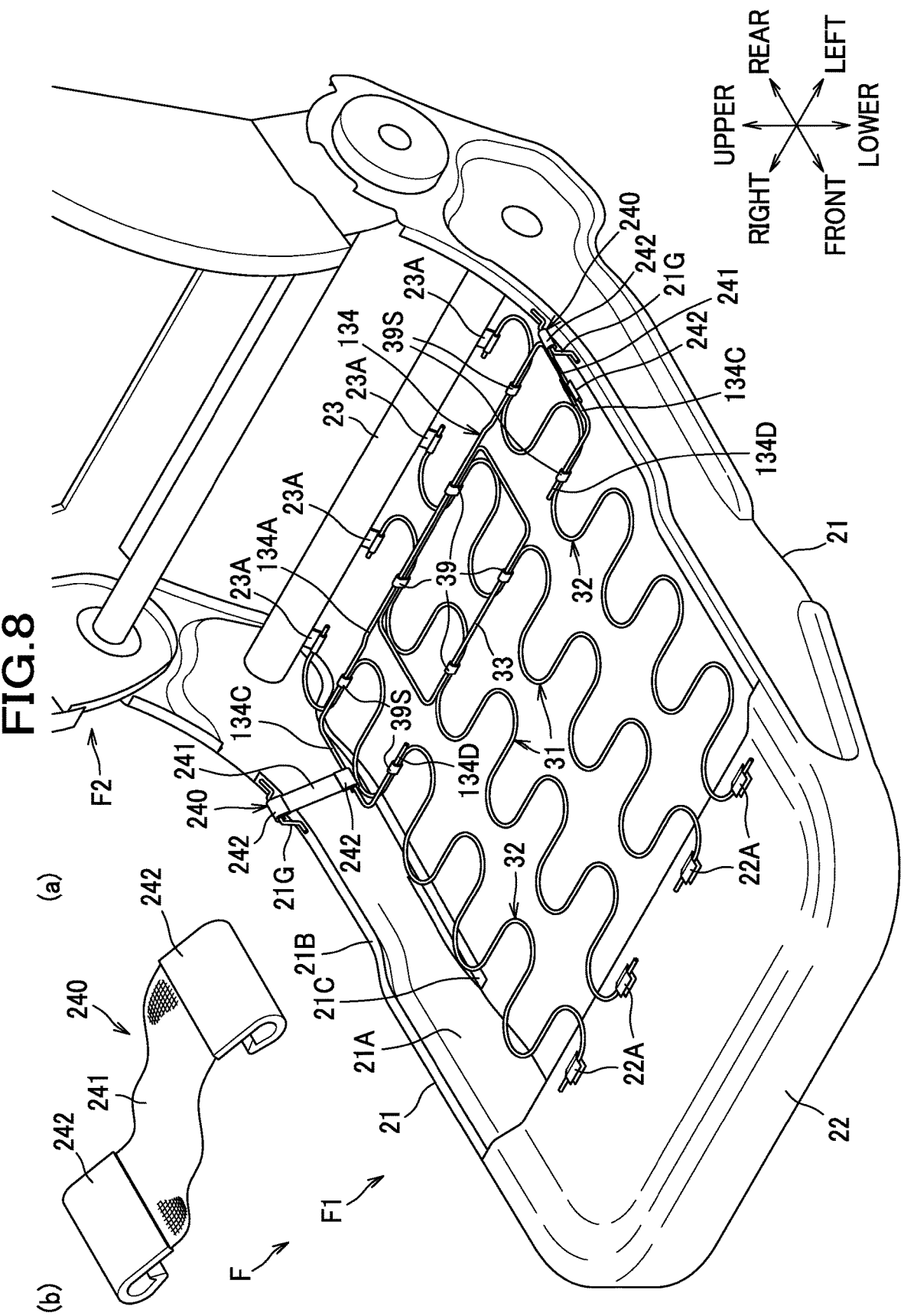
FIG. 8 includes (a) a perspective view of a cushion frame and a seat back frame incorporated in a car seat according to a third embodiment; and (b) an enlarged perspective view of a hanger band.

As shown in FIGS. 8(a), (b), a cushion frame F1 of a car seat implemented according to the third embodiment is configured such that a third support member by which the second S spring 32 is connected to the side frame 21 is configured as a band. A support band 240 comprises a cloth band 241 shaped like a strap which is less likely to stretch and hooks 242 fixed to the both ends of the cloth band 241. An elastic modulus of the cloth band 241 in the lateral direction is lower than an elastic modulus of the second S spring 32 in the front-rear direction. On the other hand, a rod 21G is fixed to the side frame 21 as with the second modified example of the second embodiment. One of the hooks 242 of the cloth band 241 is engaged on the rod 21G, and the other of the hooks 242 is engaged on the front-rear extension portion 134C of the second reinforcing wire 134.

With this configuration, the support band 240 supports the second S spring 32 via the second reinforcing wire 134. The second reinforcing wire 134 thus serves to reinforce the S-shaped portion formed at the rear end portion of the second S spring 32 to provide greater rigidity therein; therefore, the second portion of the support band 240 which is disposed to support the second S spring 32 is construed as corresponding to a portion of engagement of the hook 242 on the front-rear extension portion 134C.

Figure 9:
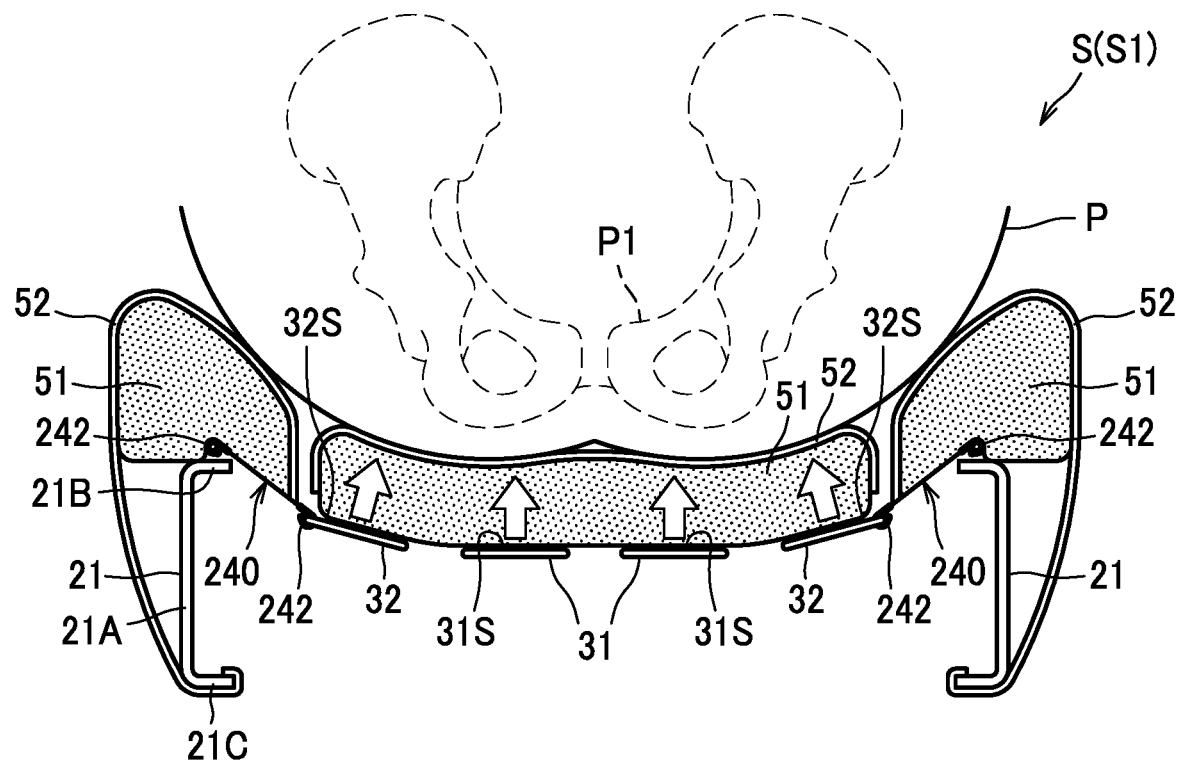
FIG. 9 is a section view of a seat cushion in the car seat according to the third embodiment as viewed in the front-rear direction.

In this configuration as well, the support band 240 can be mounted in a simple operation. Furthermore, as shown in FIG. 9, the support bands 240 serve to restrain the second S spring 32 in such a manner that laterally outer end portions of the second S springs 32 are less likely to sink down, so that the support surfaces 32S of the second S springs 32 can be tilted sideways to face laterally inward.

Although, in the present embodiment, the second S spring 32 is supported by the support band 240 via the second reinforcing wire 134, the hook 242 may be engaged directly on the second S spring 32. In this alternative configuration, a front-rear extending portion of the second S spring 32 may preferably be provided with a straight-line segment instead of being curved continuously with arc-shaped segments.

Fourth Embodiment

Next, a description will be given of a car seat according to a fourth embodiment. In describing the fourth embodiment, only the aspects distinct from those of the first embodiment will be mentioned, and a detailed description of the features in common with those of the first embodiment, which may be illustrated in the drawings with the same reference numerals, will be omitted.

Figure 10:
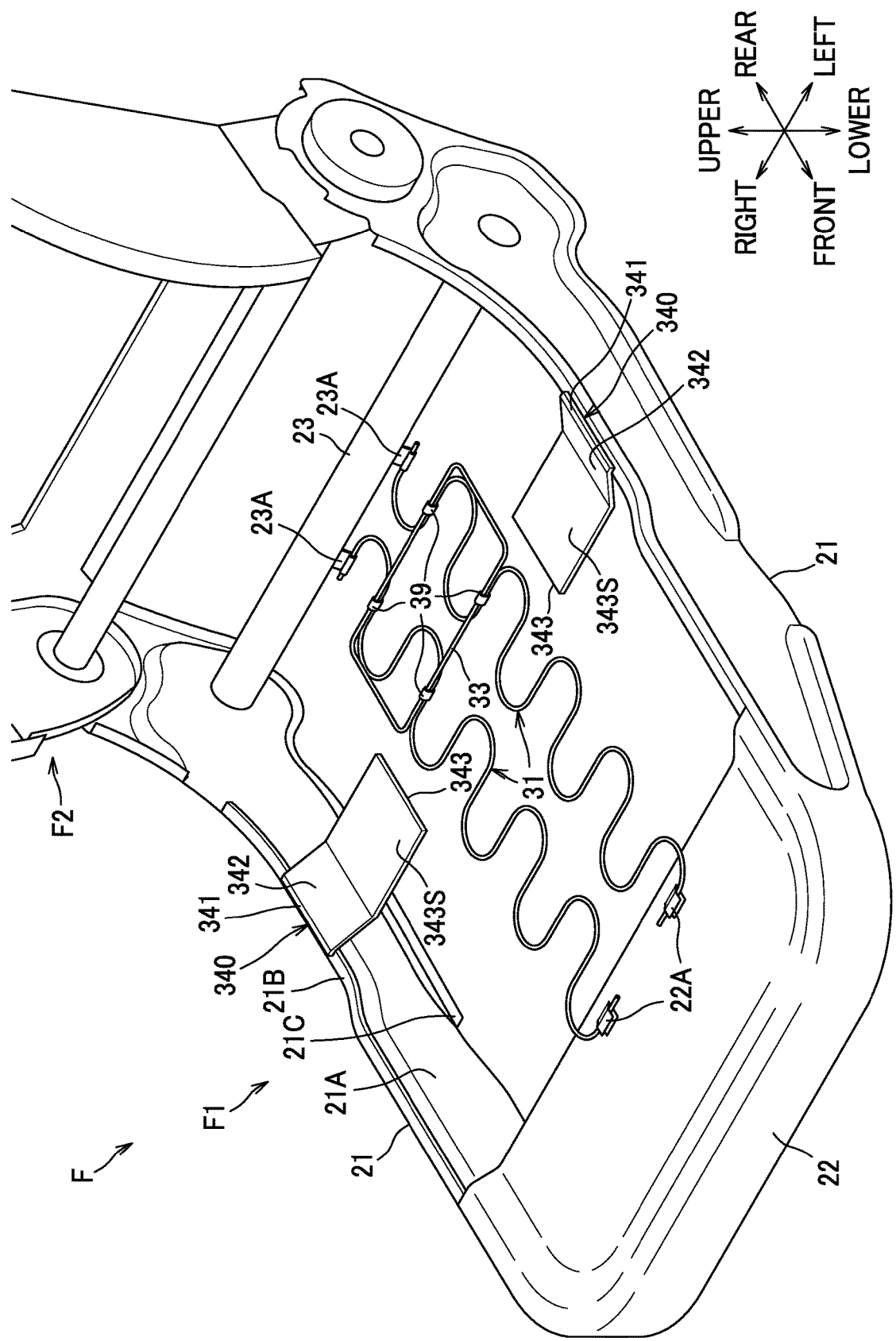
FIG. 10 is a perspective view of a cushion frame and a seat back frame incorporated in a car seat according to a fourth embodiment.

As shown in FIG. 10, the cushion frame F1 of the car seat according to the fourth embodiment fails to include second S springs 32, and is provided with side portion support members 340, as an example of second support members each of which is made of an elastically deformable leaf spring of which a laterally outer end portion is fixed to the side frame 21.

Each of the side portion support member 340 includes a fixed portion 341 laid on the upper flange 21B of the side frame 21, an extension portion 342 extending from a laterally inner end of the fixed portion 341 in an obliquely downward direction, and a support portion 343 extending from a laterally inner end of the extension portion 342 horizontally in a laterally inward direction.

The side portion support members 340 are located in positions on or slightly ahead of the position of the ischial bones of a seated occupant in the front-rear direction.

The fixed portion 341 is welded or otherwise unrotatably fixed to the upper flange 21B. To be more specific, the side portion support member 340 has a cantilever construction with which it is fixed to the side frame 21. In this embodiment, a portion of each side portion support member 340 fixed to the side frame 21 (i.e., a portion corresponding to the fixed portion 341 of the side portion support member 340) corresponds to the restraining portion.

With this configuration, in a state where no occupant is seated on the seat cushion S1, as shown in FIG. 11(a), the first S springs 31 and the support portions 343 do not sag down, and the support surfaces 343S, i.e. upper surfaces of the support portions 343, face vertically upward (the first position). The support surfaces 31S of the first S springs 31 also face vertically upward.

When an occupant P sits on the seat cushion S1, as shown in FIG. 11(b), the first S springs 31 and the side portion support members 340 are weighed down with the occupant P. In that event, the first S springs 31 sink down with their support surfaces 31S being kept facing upward, while the side portion support members 340 with their laterally outer end portions fixed to the side frames 21 have their laterally outer sides less likely to sink down than their laterally inner sides whereby the support surfaces 343S become tilted sideways to face laterally inward (second position) relative to the vertically-upward-facing position. Accordingly, the side portions of the buttocks and femoral regions of the seated occupant P are held from outside and supported obliquely upward between the support surfaces 343S, so that the support surfaces 343S firmly support the side portions of the buttocks and the femoral regions of the seated occupant P. As a result, the pressure placed on and around the ischial bones P1 is lowered relatively, so that the seated occupant is supported on the entire region including the ischial bones P1 and their vicinities, the buttocks, and the femoral regions with balanced pressure distribution. Thus, with the car seat S according to the present embodiment, poor blood circulation in the buttocks and femoral regions of the seated occupant P can be prevented and the likelihood of the seated occupant P getting a feeling of fatigue can be reduced accordingly.

Moreover, the side portion support members 340 are deformable to have their support surfaces 343S tilted sideways to face laterally inward according to the weight and size of the seated occupant P, so that the seat cushion S1 become contoured to approximate the shapes which fit those of the buttocks and femoral regions of the seated occupant P, and a good riding comfort can be offered irrespective of the physique of the seated occupant P.

Fifth Embodiment

Next, a description will be given of a car seat according to a fifth embodiment. In describing the fifth embodiment, only the aspects distinct from those of the first embodiment will be mentioned, and a detailed description of the features in common with those of the first embodiment, which may be illustrated in the drawings with the same reference numerals, will be omitted.

In the first embodiment, the reinforcing wire 33 is provided to connect the two first S springs 31 and the hanger wire 34 is also provided to connect the two first S springs 31. However, as shown in FIG. 12, a reinforcing wire 133 may be provided which is configured to reinforce the rear end portion of each first S spring 31 but not configured to connect the two first S springs 31. Also, a hanger wire 134 may not be configured to connect the two first S springs 31. In such a configuration that no wire is provided to connect the rear end portions of the two first S springs 31, the first S springs 31 are rendered likely to sag down, so that the supporting force exerted by the first S springs 31 disposed directly under the ischial bones can be made smaller. As the supporting force exerted by the first S springs 31 is made smaller, the supporting force to be exerted by the second support springs 32 becomes larger, and the seated occupant can be supported not only at a region directly under the ischial bones but on the entire region including the buttocks and the femoral regions with balanced pressure distribution, so that the pressure for supporting the ischial bones can be made smaller. In this way, poor blood circulation can be prevented and the likelihood of getting a feeling of fatigue can be reduced.

Although the illustrative embodiments of the present invention have been described above, the present invention is not limited to the above-described embodiments, and can be changed or modified where appropriate for practicable applications.

For example, the side portion support member 340 in the fourth embodiment is described as being welded or otherwise fixed to the side frame 21, but may be provided in a member configured integrally with the side frame 21.

The car seat S may be configured as a bucket seat comprising a seat cushion S1, a seat back S2 and a headrest S3 integrally formed in one piece.

Furthermore, the seat according to the present invention may be a vehicle seat other than a car seat, or may be a seat other than a vehicle seat.

Although the first support member and the second support members in the above-described embodiments are supported directly by the seat cushion frame, but the first support member and the second support members may not be directly supported by the seat cushion frame. For example, the first support member and the second support members may be directly supported by the seat cushion pad, which is in turn supported by the seat cushion frame.

The first support member and the second support members may be springs other than S springs.

The restraining portion may not necessarily be connected to the side frames, but a connecting member such as a pipe by which the left and right side frames are connected may be provided and a member configured to support portions of the second support members may be provided in the connecting member as a restraining portion. For example, an upwardly protruding restraining member may be fixed to the pipe connecting the left and right side frames, and configured to have its upper end disposed contactable from below with the laterally outer portions of the second support members.

Furthermore, any of the elements explained in relation to the above-described embodiments and modified examples may be implemented in combination as desired.

The invention claimed is:
1. A seat comprising:
a cushion frame;
a first support member supported by the cushion frame, the first support member being configured to support a seated occupant;
second support members disposed at left and right sides of the first support member, the second support members being configured to be deformable, each of the second support members consisting of an S spring slung across the cushion frame in a front-rear direction, the S spring winding leftward and rightward alternately, and each of the second support members comprising straight-line portions extending straight in a lateral direction, each of the second support members comprising a support surface at an upper side of a respective one of the second support members to support the seated occupant; and
a restraining portion by which each of the second support members is restrained in such a manner that an outer side thereof in the lateral direction is less likely to sink down than a center side thereof in the lateral direction, wherein the support surface is so restrained by the restraining portion as to assume a first position when no occupant is seated, and to assume a second position when an occupant is seated, the support surface being tilted sideways to face inward further in the second position than in the first position, the restraining portion comprising:

an oblique portion, and
a lateral portion, the lateral portion extending parallel to the second support member in the lateral direction, and the oblique portion extending from the lateral portion obliquely in a laterally-outward-and-upward direction,
wherein the lateral portion is fixed to a straight-line portion of the second support member, and
wherein an angle formed by the oblique portion of the restraining portion with a horizontal plane is greater than a rotation angle formed by the support surface after tilted to the second position, with the support surface in the first position.

2. The seat according to claim 1, further comprising:
a reinforcing member,
wherein the first support member consists of a plurality of S springs slung across the cushion frame in the front-rear direction, the S spring winding leftward and rightward alternately, the plurality of S springs comprising a left first S spring and a right first S spring connected by the reinforcing member, and
wherein the reinforcing member comprises a portion that is so shaped as to surround both of a single S-shaped portion formed at a rear end portion of the left first S spring and a single S-shaped portion formed at a rear end portion of the right first S spring, and is fixed at spots on front and rear sides of the S-shaped portions.

3. The seat according to claim 2, wherein the reinforcing member is laid on a laterally extending extension line of the lateral portion of the restraining portion.

4. The seat according to claim 2, wherein the reinforcing member further comprises a left-right connecting portion connecting a rear end portion of the first support member and a rear end portion of the second support member,
wherein the first support member comprises straight-line portions extending straight in the lateral direction, and
wherein the left-right connecting portion is fixed to a straight-line portion of the first support member and to a straight-line portion of the second support member.

5. The seat according to claim 4, wherein the restraining portion is made of a wire, and
wherein the left-right connecting portion of the reinforcing member is joined to the restraining portion, and comprises the lateral portion of the restraining portion.

6. A seat, comprising:
a cushion frame including a pair of side frames disposed separately from each other in a lateral direction, the pair of side frames extending in a front-rear direction;
a support member supported by the cushion frame, the support member being configured to support a seated occupant;
a cushion pad supported by the support member; and
a restraining portion by which the support member is restrained, and
wherein the restraining portion includes a pair of third support members each including a first portion and a second portion, the second portion being disposed at a laterally inner side of the first portion, the first portion of each of the third support members being connected to a corresponding side frame, and the second portion of each of the third support members being disposed to support the support member,
wherein the cushion pad comprises a slit provided from a top surface toward a bottom of the cushion pad, and
wherein the slit overlaps the third support member as viewed from above or below.

7. The seat according to claim 6, wherein each of the third support members comprises an oblique portion extending from the second portion obliquely in a laterally-outward-and-upward direction, and
wherein the slit overlaps the oblique portion as viewed from above or below.

8. The seat according to claim 6, wherein each of the third support members comprises an oblique portion extending from the second portion obliquely in a laterally-outward-and-upward direction, and
wherein the slit overlaps the oblique portion as viewed from left or right.

9. The seat according to claim 6, wherein each of the third support members is of, a plastic plate and comprises:
a fixed portion fixed on a corresponding side frame;
an extension portion extending from a laterally inner end of the fixed portion obliquely in a laterally-inward-and-downward direction; and
a support portion extending from a laterally inner end of the extension portion horizontally in a laterally inward direction.

10. The seat according to claim 9, wherein the slit overlaps the extension portion as viewed from above or below.

11. The seat according to claim 9, wherein the slit is located laterally inward of the fixed portion.

12. A seat comprising:
a cushion frame, comprising:
a pair of side frames disposed separately from each other in a lateral direction, the pair of side frames extending in a front-rear direction;
a support member supported by the cushion frame, the support member being configured to support a seated occupant;
a cushion pad supported by the support member; and
side portion support members fixed to the cushion frame, each of the side portion support members being fixed to a corresponding side frame, and each of the side portion support members consists of a plate comprising:
a fixed portion fixed on the corresponding side frame;
an extension portion extending from a laterally inner end of the fixed portion obliquely in a downward direction; and
a support portion extending from the laterally inner end of the extension portion horizontally in a laterally inward direction,
wherein the cushion pad comprises a slit provided from a top surface toward a bottom of the cushion pad, and
wherein the slit overlaps the side portion support member as viewed from above or below.

13. The seat according to claim 12,
wherein the extension portion extends from the fixed portion obliquely in a laterally-inward-and-downward direction, and
wherein the slit overlaps the extension portion as viewed from left or right.

14. The seat according to claim 12,
wherein the extension portion extends from the fixed portion obliquely in a laterally-inward-and-downward direction, and
wherein the slit is located laterally inward of the fixed portion.

15. The seat according to claim 12, wherein the support member comprises a straight-line portion extending straight in a lateral direction, wherein each of the side portion support members is fixed at a fixed spot on the straight-line portion of the support member, and wherein the slit is provided in a position out of a region in which the fixed spot of the straight-line portion is located as viewed from above or below.

\* \* \* \* \*